United States Patent
Ortega et al.

(10) Patent No.: US 7,565,157 B1
(45) Date of Patent: Jul. 21, 2009

(54) SYSTEM AND METHOD FOR PROVIDING SEARCH RESULTS BASED ON LOCATION

(75) Inventors: Ruben E. Ortega, Seattle, WA (US); Robert Frederick, Seattle, WA (US); Barnaby Dorfman, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 357 days.

(21) Appl. No.: 11/283,056

(22) Filed: Nov. 18, 2005

(51) Int. Cl.
*H04W 24/00* (2009.01)

(52) U.S. Cl. .................... 455/456.2; 455/414.3

(58) Field of Classification Search .......... 455/456.1, 455/456.2, 456.3, 456.4, 456.5, 456.6, 457; 707/3, 102
See application file for complete search history.

(56) References Cited

U.S. PATENT DOCUMENTS

| | | | |
|---|---|---|---|
| 5,384,824 A | 1/1995 | Alvesalo | |
| 6,466,918 B1 * | 10/2002 | Spiegel et al. ............ | 705/27 |
| 6,526,275 B1 * | 2/2003 | Calvert ................ | 455/418 |
| 6,563,459 B2 | 5/2003 | Takenaga | |
| 6,564,213 B1 * | 5/2003 | Ortega et al. ............ | 707/5 |
| 2002/0067308 A1 | 6/2002 | Robertson | |
| 2002/0068599 A1 | 6/2002 | Rodriguez et al. | |
| 2002/0119788 A1 | 8/2002 | Parupudi et al. | |
| 2002/0152021 A1 * | 10/2002 | Ota et al. ............. | 701/208 |
| 2003/0216960 A1 | 11/2003 | Postrel | |
| 2004/0111369 A1 | 6/2004 | Lane et al. | |
| 2004/0204063 A1 | 10/2004 | Van Erlach | |
| 2005/0079877 A1 * | 4/2005 | Ichimura ............... | 455/456.1 |
| 2005/0136904 A1 | 6/2005 | Siddiqui | |
| 2005/0278114 A1 * | 12/2005 | Ahmad ................ | 701/211 |
| 2006/0026147 A1 * | 2/2006 | Cone et al. ............. | 707/3 |
| 2006/0123014 A1 * | 6/2006 | Ng ................... | 707/100 |
| 2007/0061245 A1 * | 3/2007 | Ramer et al. ........... | 705/37 |
| 2007/0100801 A1 * | 5/2007 | Celik et al. ............ | 707/3 |

OTHER PUBLICATIONS

Garmin, Nav Talk GSM, "The seamless integration of communication, navigation, and organization", available at http://www.garmin.com/products/navTalkGSM/, available at least by Aug. 23, 2005 (6 pgs.).

(Continued)

*Primary Examiner*—Erika A Gary
(74) *Attorney, Agent, or Firm*—Townsend and Townsend and Crew LLP

(57) ABSTRACT

A method for providing a listing of common searches based on a location. The method includes receiving a location of a mobile computing device, generating a listing of common searches associated with the location, and transmitting the listing of common searches to the mobile computing device.

29 Claims, 7 Drawing Sheets

OTHER PUBLICATIONS

Garmin, StreetPilot c340, "Beat the Traffic Before it Beats You", available at http://www.garmin.com/products/sp340/, available at least by Aug. 23, 2005 (2 pgs.).

Garmin, StreetPilot 2720, "Text-To-Speech and Optional Traffic Capability", available at http://www.garmin.com/products/sp2720/, available at least by Aug. 23, 2005, (2 pgs.).

Magellan, Products::Product Detail, "Magellan RoadMate 760 North America", available at http://www.magellangps.com/en/products/product.asp?PRODID=1091, available at least by Aug. 23, 2005 (4 pgs.).

PCWorld, GPS Cell Phones, "Armed with a GPS-enabled cell phone, you may never get lost again", available at http://www.pcworld.com/resource/printable/article/0,aid,115273,00.asp, available at least by Aug. 23, 2005 (3 pgs.).

uLocate, The Power of Where™, available at http://www.ulocate.com/, available at least by Aug. 23, 2005 (8 pgs.).

* cited by examiner

|  | 210 | 220 | 230 | 200 |
|---|---|---|---|---|
| LOCATION 1 | SEARCH 1 | SEARCH 1 INFO. | SEARCH 1 INFO. | |
| | SEARCH 2 | SEARCH 2 INFO. | SEARCH 2 INFO. | |
| LOCATION 2 | SEARCH 1 | SEARCH 1 INFO. | SEARCH 1 INFO. | |
| | SEARCH 2 | SEARCH 2 INFO. | SEARCH 2 INFO. | SEARCH 2 INFO. |
| | SEARCH 3 | SEARCH 3 INFO. | SEARCH 3 INFO. | SEARCH 3 INFO. |
| LOCATION 3 | SEARCH 1 | SEARCH 1 INFO. | SEARCH 1 INFO. | |
| | SEARCH 2 | SEARCH 2 INFO. | SEARCH 2 INFO. | SEARCH 2 INFO. |
| LOCATION 4 | SEARCH 1 | SEARCH 1 INFO. | SEARCH 1 INFO. | SEARCH 1 INFO. |
| | SEARCH 2 | SEARCH 2 INFO. | SEARCH 2 INFO. | |

FIG. 2

SYSTEM AND METHOD FOR PROVIDING SEARCH RESULTS BASED ON LOCATION

BACKGROUND

Users of mobile computing devices are becoming more and more accustomed to being able to obtain instant access to information. The information may be downloaded to the mobile computing devices using a variety of different types of wireless or wired connections such as WiFi, Bluetooth, cellular networks, etc. The information that can be downloaded may include information on almost any subject of interest to the user.

A user can access this information by performing a search. A search may include one or more keywords that are entered by the user of the mobile computing device at one or more search engine websites. For example, if a visitor to the search engine website enters the term "flowers," web sites that may be relevant to flowers are displayed. Searches can be specifically tailored to access desired information.

The amount of information that is available is often daunting. A user may recognize that a vast amounts of information is available, but may be unfamiliar with the searches that need to be performed to locate useful information. This may particularly be true where a user is using the mobile computing device in a new and unfamiliar location. Additionally, the information that is available and the searches that need to be performed to locate that information may be constantly evolving and changing.

What is needed is a system and method for assisting users of mobile devices with locating useful information. What is further needed is such a system and method that may be configured to customize the search results to the particular user.

SUMMARY

One embodiment relates to a method for providing a listing of common searches based on a location. The method includes receiving a location of a mobile computing device, generating a listing of common searches associated with the location, and transmitting the listing of common searches to the mobile computing device.

Another embodiment relates to a location aware searching system. The system includes a location database configured to maintain a listing of locations, where each location is associated with a listing of searches. The system further includes a location aware search engine system. The location aware search engine system includes a computer program stored on a computer-readable medium, configured to perform the steps of receiving a location, generating a listing of common searches associated with the location from the listing of searches, and transmitting the listing of common searches to a mobile computing device.

Yet another embodiment relate to a location aware searching system. The location aware searching system includes a computer-implemented web site. The web site is configured to generate a user profile for a user based on activity of the user when visiting the web site. The location aware searching system further includes a location aware search engine system including a computer program configured to perform the steps of receiving a location, generating a listing of common searches associated with the location, filtering the listing of common searches based on the user profile from the web site system, and transmitting the listing of common searches to a mobile computing device.

This summary and the following detailed description are directed to certain specific embodiments of the invention. The invention is not limited to the particular embodiments and applications described herein. The invention is defined only by the claims.

BRIEF DESCRIPTION OF THE DRAWINGS

FIG. 2 is a table representative of a location database including a listing of locations and information associated with each location, according to an exemplary embodiment;

DETAILED DESCRIPTION OF THE PREFERRED EMBODIMENTS

Figure 1:
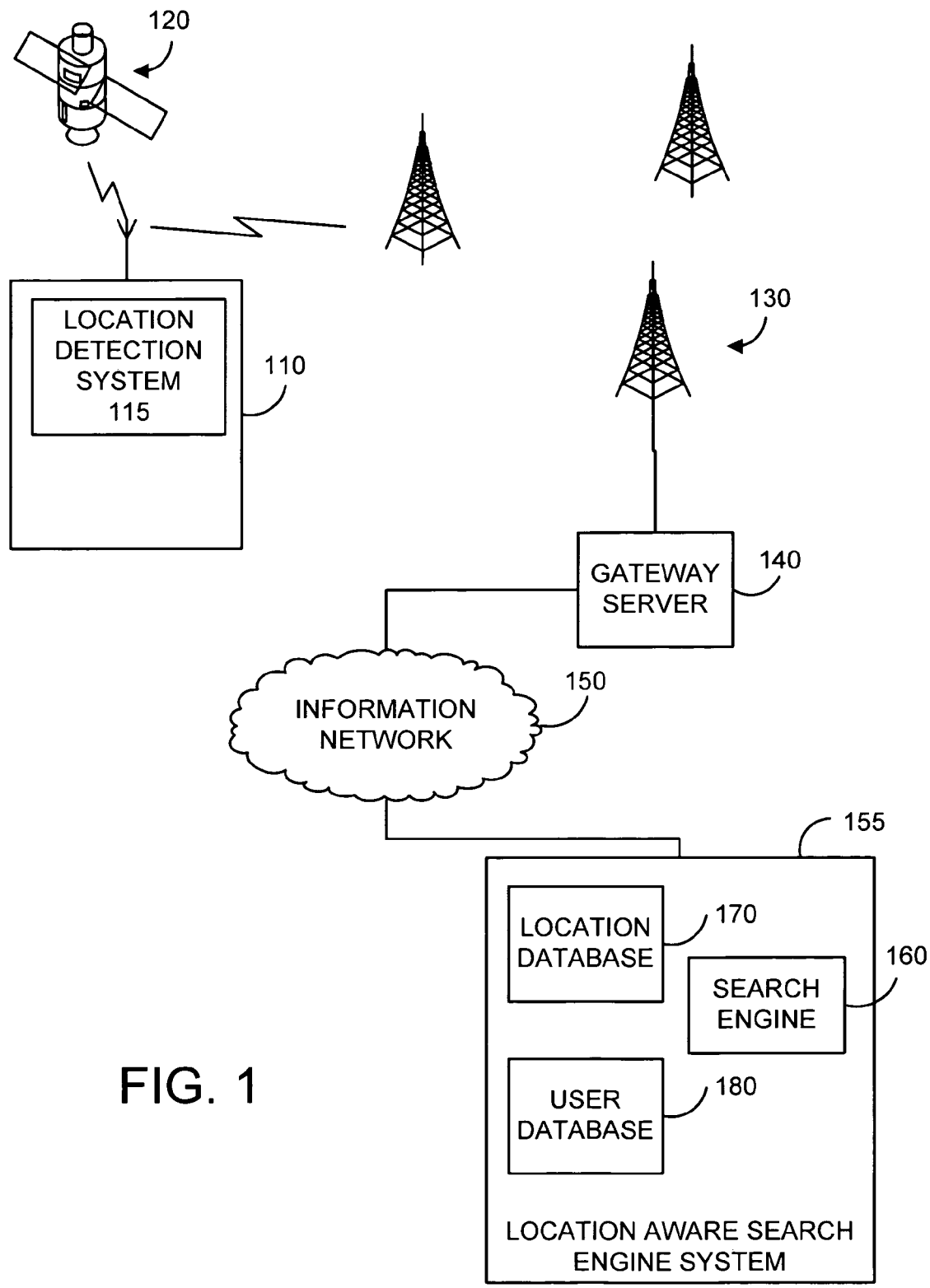
FIG. 1 is a location aware searching system for providing a listing of common searches to a user of a mobile device based on the location of the mobile device, according to an exemplary embodiment.

Referring to FIG. 1, a location aware searching system 100 configured to provide a listing of common searches to a user of a mobile device based on the location of the mobile device is shown, according to an exemplary embodiment. System 100 includes a mobile computing device 110, global positioning satellites 120, a mobile communication infrastructure 130, a gateway server 140, an information network 150, a location aware search engine system 155, and a search engine 160. According to alternative embodiments, system 100 may include additional, fewer, and/or a different configuration of the components shown in FIG. 1.

Mobile computing device 110 may be configured to provide telecommunication functions using mobile communication infrastructure 130. Mobile computing device 110 may be, for example, a cellular telephone, a personal digital assistant (PDA), a portable music player, a portable web browser, a digital camera, a video game console, or any other portable computing device. For purpose of explanation, mobile computing device 110 is described herein with reference to a cellular telephone or a device having cellular capabilities. Mobile computing device 110 may be configured to include one or more components configured to facilitate computing functions related to searching for information and presenting search results including a processor, memory, a display, etc.

According to an exemplary embodiment, mobile computing device 110 may be configured to include a location detection system 115. Location detection system 115 may include any type of system configured to determine the location of mobile computing device 110. Location detection system 115 may be implemented using hardware, software, or some combination thereof. According to an exemplary embodiment, location detection system 115 includes a Global Positioning System (GPS) receiver configured to receive global positioning signals from a plurality of global positioning satellites 120 to determine a current location of mobile computing device 110. In an exemplary embodiment, location detection system 115 may be used to determine the location of mobile computing device 110 within approximately 15 feet.

Alternatively, the location of mobile computing device 110 may be determined using any of a number of alternative locating methods. Further, location detection system 115 may be associated with any of the systems or devices within system 100. For example, where mobile computing device 110 is a cellular telephone and mobile communication infrastructure 130 is a network of cellular towers, gateway server 140 may be configured include location detection system 115 implemented as software configured to determine the location of mobile computing device 110 based on a signal received from mobile computing device 110. The accuracy of the location detection may be improved in the software using, for example, triangulation techniques and an increased number of cellular towers.

Mobile communication infrastructure 130 may be any type of communication infrastructure configured to provide connectivity between mobile computing device 110 and one or more other computing devices. An exemplary communication infrastructure 130 may include a network of cellular communication towers as shown in FIG. 1. Alternative communication infrastructures may include a wireless computing communication network such as a WiFi network, a Bluetooth network, a satellite network, or any other type of system configured to provide connectivity to mobile computing device 110.

Location detection may be provided based on the node or nodes of communication infrastructure 130 receiving a signal from device 110 as described above. Location detection using mobile communication infrastructure 130 may provide improved location detection inside buildings where GPS receivers may fail to receive GPS signals. Mobile computing device 110 may also be configured to use a combination of any number of location detection techniques to determine its current location. Location detection may be configured to be performed either automatically or based upon a user-driven location update instruction.

Location detection system 115 may further be configured to determine the orientation and/or direction of movement of the user. "Orientation" may be the current direction that the user is facing such as north, east, south, west. "Direction of movement" may be the direction in which the user of device 110 is traveling. The orientation and direction of movement may be determined using compass readings, data obtained from multiple waypoints, etc.

Orientation and direction of movement may be utilized by location detection system 115 to predict future locations. Specifically, the location may be set to locations that are in front of or along the direction of travel of the user. For example, where the location and/or direction of movement indicates the user is on an expressway, the location may be set to the next available exit from the expressway. Location detection system 115 may further be configured to implement a pathfinding algorithm where a user provides a destination, and the location is set to include a travel route including locations along a path between the user's current location and that destination. The predicted location may further be refined based on a detected mode of travel, such a walking, biking, driving, etc. The mode of travel may be determined based on location, speed of travel, etc.

Gateway server 140 may be any type of computing system connected to communication infrastructure 130 and configured to connect infrastructure 130 to at least one other network, such as information network 150. Gateway server 140 may be configured to transfer messages from one type of network to the other. For example, gateway server 140 may be configured to receive a web page request from mobile computing device 110 over mobile communication infrastructure 130 and convert that message to a web page request for communication over information network 150 to the computing host of the requested web page.

According to an exemplary embodiment, information network 150 may be the Internet. Information network 150 may be configured to facilitate the transfer of information to and from search engine system 155 to mobile computing device 110 through gateway server 140 and mobile communication infrastructure 130.

Location aware search engine system 155 may be a computing system configured to provide a listing of common searches based on the current location of a user utilizing mobile computing device 110, described in further detail below. Location aware search engine system 155 includes a location database 170 and a user database 180 configured to facilitate providing the listing of common searches based on location and based on one or more attributes of the user, respectively. Location database 170 is described in further detail below with reference to FIG. 2.

User database 180 includes a listing of attributes associated with a user of device 110. The attributes may be manually entered by the user or may be automatically determined by device 110 search engine system 155, and/or by another system (e.g., an on-line service with which the user has registered). For example, manually entered information may include the user's name, home address, place of employment, interests, etc. Examples of automatically determined information may include attributes of device 110, usual connection points to infrastructure 130, frequency of use of device 110, location patterns for device 110, etc. The implementation and use of user database 180 is described in further detail below with reference to FIG. 4

Referring now to FIG. 2, a table 200 representative of location database 170 including a listing of locations 210 and listing of searches 220 associated with each location is shown, according to an exemplary embodiment. Location database 170 may be implemented, for example, using any of the database computer programs that are well know in the art.

The listing of locations 210 may include possible locations from which searches have previously been requested by users of mobile computing devices. A location may be broadly defined to include a general geographic description, such as the city of Chicago, may be narrowly defined according to an exact longitude and latitude, or may be defined according to any location-based criteria, such as a region, a climate, an area of a city, etc. A location may further be defined as a location type, for example a location may be "coffee shop," independent of the particular geographic location or identity of the coffee shop.

Each listing in listing of searches 220 is a listing of all of the searches associated with a particular location from listing of locations 210. The listing of searches 220 may be sorted according to a frequency ranking of the search. A frequency ranking of the search is how many times the search has been entered by users at the particular location. Accordingly, search 1, as shown in FIG. 2, may have be entered by users more frequently than search 2. Accordingly, search 1 received the search 1 designation.

The frequency ranking of a search may be adjusted according to the recentness of the search. For example, the most popular search at a particular location may be for a music concert that happened a month ago. Even though the music concert may be the most common search, the fact that the searches are all at least a month old may be used to adjust the frequency ranking. The recentness of the search may also be used by user to target searches of interest. For example, a young professional user may be interested in finding the hottest new nightclub and be interested just in searches performed within the last month while a tourist couple may be interest sightseeing at perennial favorites in a location and be interested in consistently favorite searches performed over a long period of time. As described below, filtering may also be performed based on other parameters.

It is important to note that although only a few searches are shown in listing of searches 220, each listing of searches 220 may include any number of searches. The listing may continually be updated and reordered based on the frequency ranking of the searches or the occurrence of new searches.

The configuration of the listing of searches 220 may depend on the location type and/or how the listing of locations 210 is configured. For example, where the listing of locations 210 includes geographic designations (e.g., a city, an area of a city, and so on), the listing of searches 220 may be sorted based on the frequency ranking of the searches as previously stated. In another embodiment, rather than comprising a list of locations and a list of searches performed at each of those locations, the database 170 may comprise a list of searches and, for each search, an identification of the location where the search was performed (e.g. a GPS longitude and latitude). In this embodiment, the list of common searches may be determined dynamically, as described below.

Mobile computing device 110 may be configured to download the most common search requests for a location upon detection that the user has entered a new location. For example, a traveler, upon arriving in a Chicago airport may desire to see the most common searches that have been performed by other users at the Chicago airport. The most common searches may be the top ten searches, the top twenty, or some other selection of the common searches.

Downloading the most common searches may also include downloading current search results for the most common searches. For example, the Chicago traveler may use device 110 to receive a common searches listing indicating that the most common search at the Chicago airport is for "cold weather gear." Device 110 may be configured to also download a listing of search results for "cold weather gear" to device 110 for easy and fast access of the search results by the user of device 110.

Each of the searches in listing of searches 220 may further include additional search information 230 associated with the searches. According to an exemplary embodiment, the additional information may include one or more attributes associated with each search. Exemplary attributes may include timing information such as a time of day, a time of year, a season, etc., type of user information, a user grouping associated with the searches, search type information, etc. The attributes may include any information that is available and associated with the common search. As shown by the varying number and size of the boxes of additional information, the amount and type of information associated with each of the searches may also be variable. The attributes may be used in generating a more customized listing of common searches, as described in further detail below with reference to FIGS. 4 and 7.

It should be understood that the listing of searches 220 in location database 170 may be continuously updated. Accordingly, each time a user of a device 110 uses the device or any other device to perform a search on search engine 160, a location may be associated with the search and this information may be used to update location database 170. The location database 170 may similarly be updated based on searches performed by any other user. Accordingly, the listing of common searches, i.e., the listing that is presented as common searches, will also evolve or change over time based on current events, shifting interests as determined by the searches that are performed, changes in demographics at a location, etc. Database 170 may be maintained and implemented using a computer program and processor associated with location aware search engine system 155.

Figure 3:
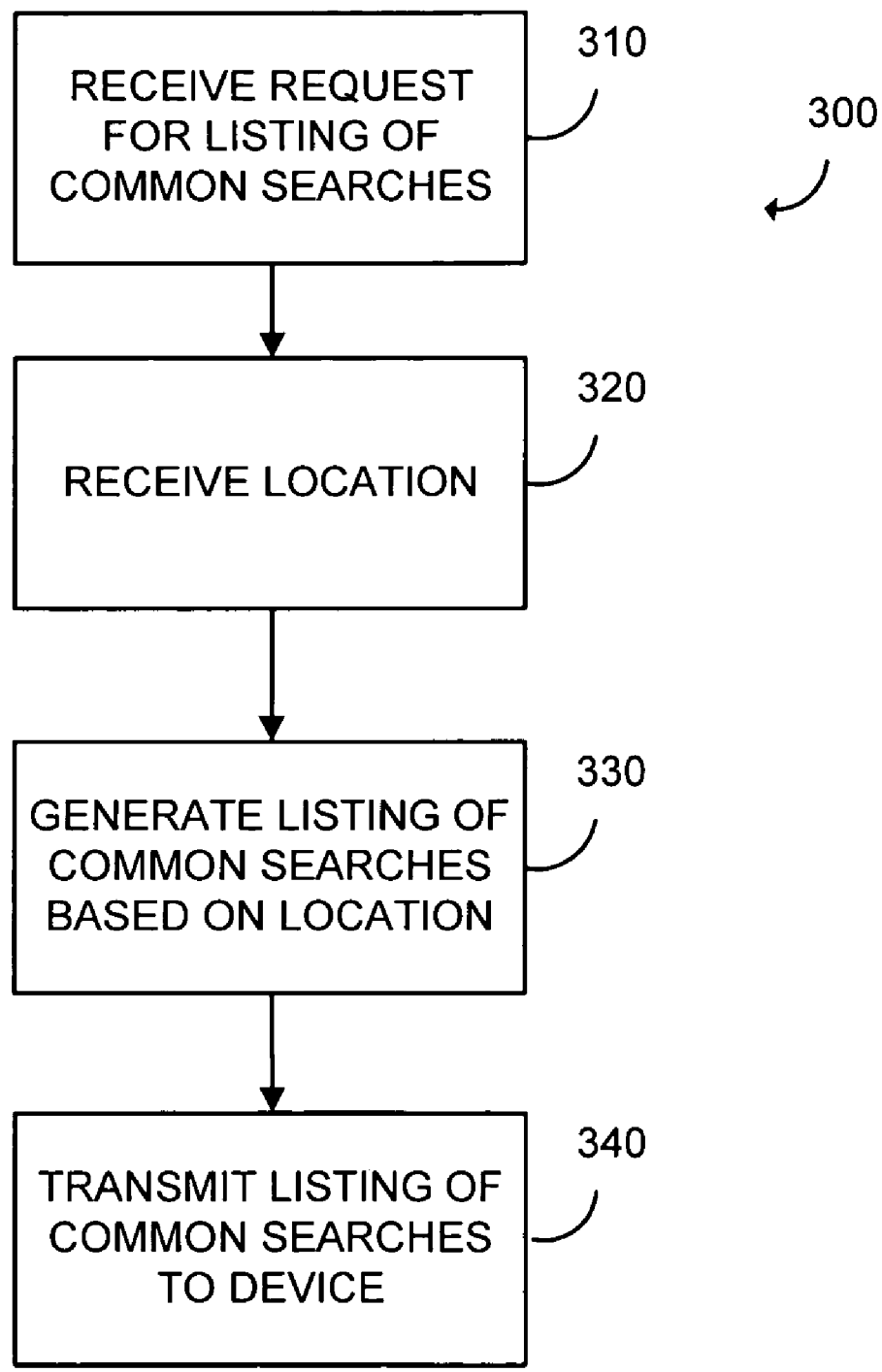
FIG. 3 is a flowchart representative of a method for providing a listing of common searches based on the location of the mobile computing device of FIG. 1, according to an exemplary embodiment.

Referring now to FIG. 3, a flowchart representing a method 300 for providing a listing of common searches based on the location of mobile computing device 110 is shown, according to an exemplary embodiment. The method may be implemented by location aware search engine system 155.

In a step 310, the method 300 for providing a new listing of common searches based on location is initiated. The initiation of method 300 may be based on any of a variety of events such as a user request, detection of a new location by device 110, an elapsed time, detection of a change in the listing of common searches within listing 210, etc. Method 300 may further be initiated by either the mobile computing device 110 in a "pull-type" operation, for example where user of the mobile computing device inputs a request for a new listing of common searches based on its current location, or by location aware search engine system 155 in a "push-type" operation, for example after detecting that a specified amount of time has elapsed since the listing was last updated or that device 110 is in a new location.

Device 110 may be configured to transmit the request for a listing of the most common searches associated with the current location to location aware search engine system 155. The request may be transmitted using any of a variety of techniques, such as an application programming interface (API) function call to a computer program running on location aware search engine system 155, an email request that can be parsed by location aware search engine system 155, a file transfer protocol (ftp) request for a file containing the requested information, etc.

The location of device 110 may be determined in a step 320. For example, the location of device 110 may be determined based upon one or more GPS signals received by device 110. Upon initiation of method 300, device 110 may be configured to automatically attempt to determine its current location. For example, a user arriving in Chicago may power up device 110. Upon powering up, device 110 may be configured to receive a GPS signal to determine its current location. Alternatively, device 110 may be configured such that the user may manually enter a desired location using an input device associated with device 110. Alternatively, the location of device 110 may be determined by location aware search engine system 155 based on, for example, information received from one or more cellular towers associated with mobile communication infrastructure 130 or a location received from gateway server 140.

Upon receiving the location and the request for a listing of common searches, search engine system 155 may be configured to generate a listing of the most common searches for that location in a step 330. Where listing of searches 220 is pre-sorted based on the frequency ranking of the searches, step 330 may simply include retrieving a top number of searches from listing of searches 220 associated with the current location from location database 170.

Alternatively, the listing of common searches may be generated dynamically upon receipt of the request based on a frequency ranking associated with each search. The listing of searches 220 may be ranked according to both how often the search has been performed and a geographic proximity between each of the searches and the current location of device 110. The listing of common searches may be generated using the highest ranked searches.

The listing of common searches may be transmitted by location aware search engine system 155 to device 110 in a step 340. The listing of common searches may be transmitted to device 110 through information network 150 and communication infrastructure 130. The listing of common searches may be transmitted in any of a variety of formats. For example, the listing of common searches may be transmitted as an html document, in an electronic mail message, as a text document, as a spreadsheet, etc. The format for the listing of common searches may be configured to be dependent on one or more attributes of device 110. For example, where the device 110 is a cellular phone with a relatively smaller display, the preferred format may be a simple text document. However, where device 110 is a portable computer, the format may be a full html document with SVGA graphics, embedded links, etc.

Where device 110 and location aware search engine system 155 are configured to implement a push-type operation, location aware search engine system 155 may be configured to transmit the listing of common searches when device 110 is not otherwise active to avoid a negative effect on a communication throughput for device 110. Push-type operations provide updated listings of common searches to the user on demand without requiring interaction by the user.

The listing of common searches that is transmitted to device 110 may include the most common searches from listing of searches 220 from database 170. The listing may further be configured to include additional information that may be useful to a user viewing the listing. For example, the listing of common searches may be configured to include the results of the common searches, advertising related to the common searches, advertising related to the location, links to additional information based on the current location, etc. For example, where a user of device 110 in Chicago receives a listing of common searches including the search for "cold weather gear," the listing may be configured to include an advertisement offering winter coats for sale.

Upon receipt, device 110 may be configured to either display or store the listing of common searches based on location. A stored listing may be updated based on receipt of a new listing or based on a new search request by the user of device 110. Search engine system 155 may also be configured to monitor user interaction with the list of common searched that is presented. For example, if a user selects a particular search, this information may be tracked so that the search may be ranked higher in the future.

Device 110 may further be configured to utilize the listing of common searches to implement and/or supplement an autocomplete function when a user is manually entering a search string using device 110, for example, in accordance with the teachings of U.S. Pat. No. 6,564,213, entitled "Search Query Autocompletion," hereby incorporated by reference. The listing of common searches may be used to suggest autocompletion strings and/or to bias suggested autocompletion strings to favor strings corresponding to searches commonly performed at the user's location. For example, a user may start typing a keyword "restaurants" in a search engine web page being displayed on device 110. Device 110 may be configured to recognize, using the listing of common searches, that users at the current location of device 110 often search for restaurants. Accordingly, device 110 may automatically display the keyword "restaurants" after the user has only entered a first few letters, such as "re", reducing the amount of typing for the user. An autocomplete function based on location may be utilized to eliminate or reduce the prominence of autocomplete keywords that may not be applicable to the current location, such as, for example, "red square," "red pandas," "regulators," etc.

Figure 4:
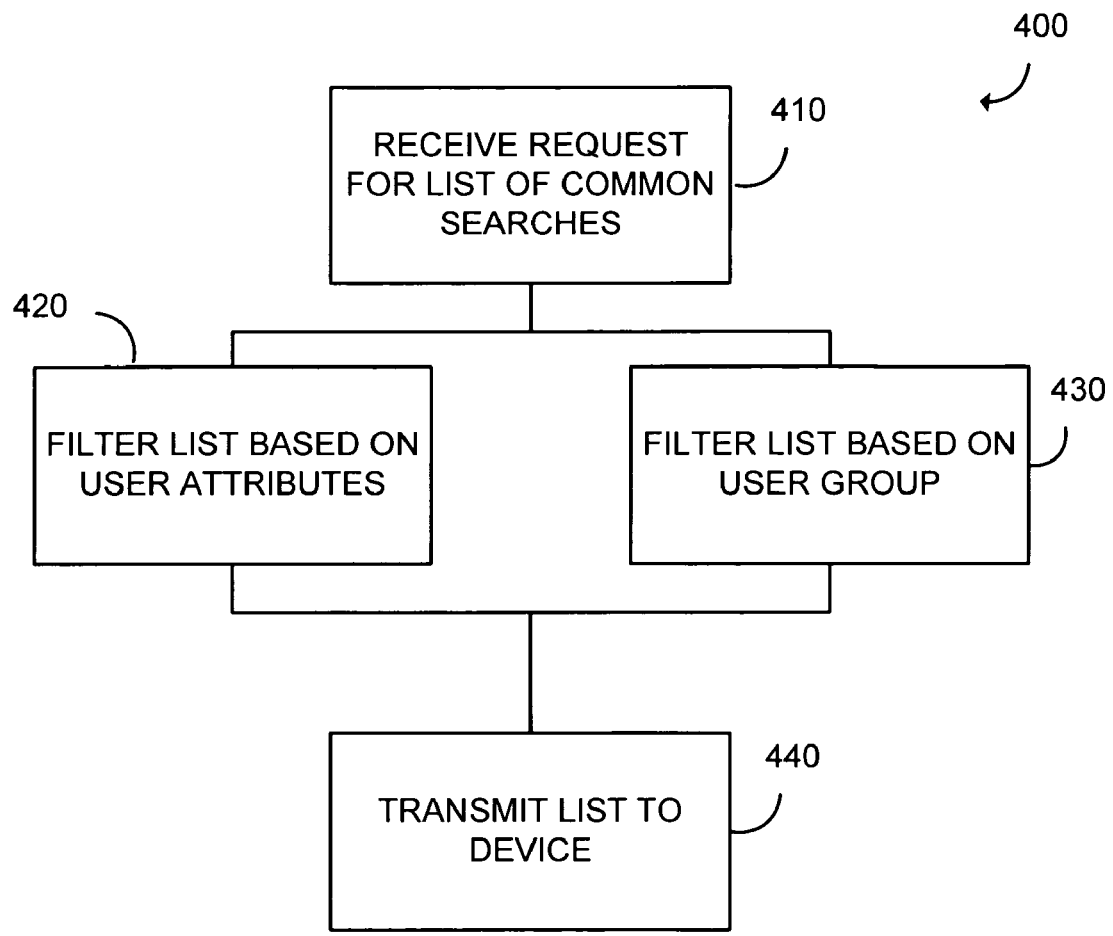
FIG. 4 is a flowchart representative of a method for applying a filter to a listing of searches to generate an optimized listing of common searches, according to an exemplary embodiment.

Referring now to FIG. 4, a flowchart depicting a method 400 for applying a filter to a listing of searches 220 to generate an optimized listing of common searches is shown, according to an exemplary embodiment. Method 400 may be used to customize the listing of common searches according to one or more criteria associated with a user of device 110. Providing a customized listing provides the most common searches performed at the current location that may be of interest to a particular user.

In a step 410, location aware search engine system 155 receives a request for the most common searches based on the current location of device 110, similar to step 310 in FIG. 3. Search engine system 155 may be configured, according to a user profile set in user database 180, to filter the listing based one or more user attribute filters also stored in user database 180, described in further detail below. Alternatively, the request received in step 410 may be configured to include an indication that the listing of common searches should be generated based on one or more user attribute filters and one or more of the user attributes.

User attributes may include any type of information associated with the user of device 110. Exemplary attributes can be any information that may be useful in determining the type of searches that may be of interest to the user. For example, user attributes may include the user's age, the user's employer, the user's past purchase history, user defined interests such as sport, technology, outdoor activities, dining, etc. The user attributes may be manually defined by the user or may be determined automatically based on the user's activity, location, attributes of device 110, etc. For example, user attributes may be determined based on a user's on-line behavior. Exemplary behavior may include items purchased, items viewed, searches entered, wish list items selected, amount of time spent or frequency of visits at any one particular web site or type of web site, etc.

User attributes may be stored and maintained in user database 180. Search engine system 155 may be configured to maintain and update user database 180. User database 180 may be updated based on detected changes to one or more attributes associated with the user of device 110, such as new interests as evidenced by recent searches, etc.

The user attribute filters may be determined in a step 420. The user attribute filters may be received in the request for a listing of common searches or may be retrieved from user database 180. User attribute filters stored in user database 180 may be generated based on a request from the user that future listings of common searches should be filtered based on one or more of the user attributes. The request may be accompanied by a designation of one or more user attributes to be used for filtering the results. The user attribute filter may also be dynamically maintained by modifying the user attributes based of actual user activity. For example, if a user habitually elects to receive more information on searches related to outdoor activities, a user attribute indicating a preference for outdoor activities may be used to filter future listings of common searches. Each user attribute may further be associated with a weighting to emphasize or de-emphasize user attributes based on user activities.

In a step 430, the listing of searches may alternatively be filtered according to a defined sub-group of users, referred to hereafter as a user group. The user group may be defined by the user. For example, a user may select a known group of users. The known group of users may be specifically identified users, e.g. designated by a username, or may be users having defined attributes.

Alternatively, a user group may defined automatically based on the user's past activity. For example, user attribute information may be available based on a user's activity at an on-line retail website. The activity may include searches entered, items clicked on, advertisements clicked on, items purchased, frequency of purchases, cost of items purchased, etc. The activity may be analyzed to predict the user's future behavior and associate the user with a user group having the same pattern of activity. The user group and assumptions about the user group may be used to filter the listing of common searches to target the user's interests (i.e., the searches that are presented to the user may be determined based on whether previous users in the same user group have selected the searches for viewing or have manually entered the search).

Filtering the listing of searches according to a user group allows the user to only receive searches including additional search information indicating that the searches were performed by a group of users that the user has specifically designated or that has been chosen based on mutual interests. The user group may also be either received in the request for a listing of common searches or retrieved from user database 180.

It should be understood that the filters described above in steps 420 and 430 may be combined such that the user requests filtering based on both a user attribute filter and a defined user group. The degree to which each filter method is used may also be defined by the user or automatically defined based on the activities of the user.

In a step 440, the listing of searches may be filtered according the filtering technique designated in either step 420 or step 430 and by frequency ranking to produce an optimized listing of common searches. Advantageously, the optimized listing of common searches will be more likely to have searches that are of interest to the particular user of device 110. Further, any information that is included with the listing of common searches may also be customized based on the designated filters.

Although two filters are described in detail above with reference to FIG. 4, it should be understood that the listing of common searches may further be filtered according to other criteria/methods. For example, a listing of common searches may be generated and/or filtered according to other information such as information received from a news source. The news source may be selected based on the location, for example, the news source may be a local news source which provides information relevant to the current location. Examples may include local traffic, locations that are the subject of a blog, local events, such as a parade that will occur near the user's location, etc. The news source may also be selected based on the user's interests. The user's interests may be manually entered or may be generated based on the user's activities (e.g., recent searches entered, recent purchases made, travel habits, etc.). For example, the news source may be a local newspaper restaurant review. Accordingly, the listing of common searches may be filtered such that only restaurants that have been recently reviewed by the local newspaper are displayed in the listing of common searches.

Figure 5:
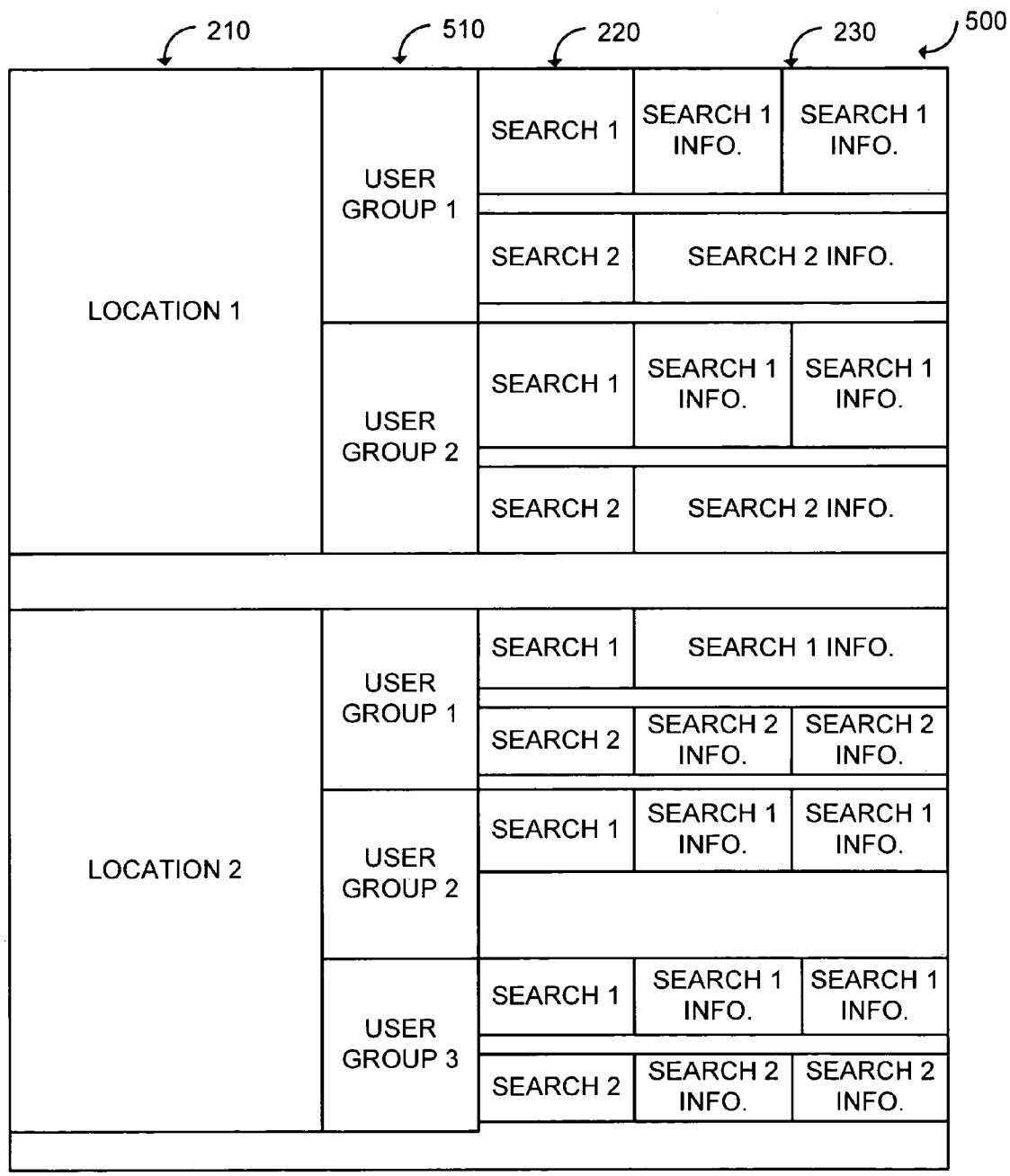
FIG. 5 is a table representative of a location database including a listing of locations where each location includes a listing of user groups and a listing of searches for each user group, according to an exemplary embodiment.

Referring now to FIG. 5, a table 500 representative of location database 170 including a listing of locations 210 where each location includes a listing of user groups 510 and a listing of searches 220 for each user group is shown, according to an exemplary embodiment. Table 500 is similar to table 200 with the exception that the information associated with each location is sorted according to one or more defined user groups.

Filtering the listing of searches in method 400 may be implemented using table 500. The listing of searches may also be sorted according to any additional fields. The additional fields may be included in the additional information associated with each of the common searches. For example, although table 500 shows the listing of searches by location sorted according to a defined user group as described in step 420 of the method 400, the results could alternatively be sorted according to one or more user attributes as described in step 410 of the method 400, both shown and described above in FIG. 4.

Figure 6:
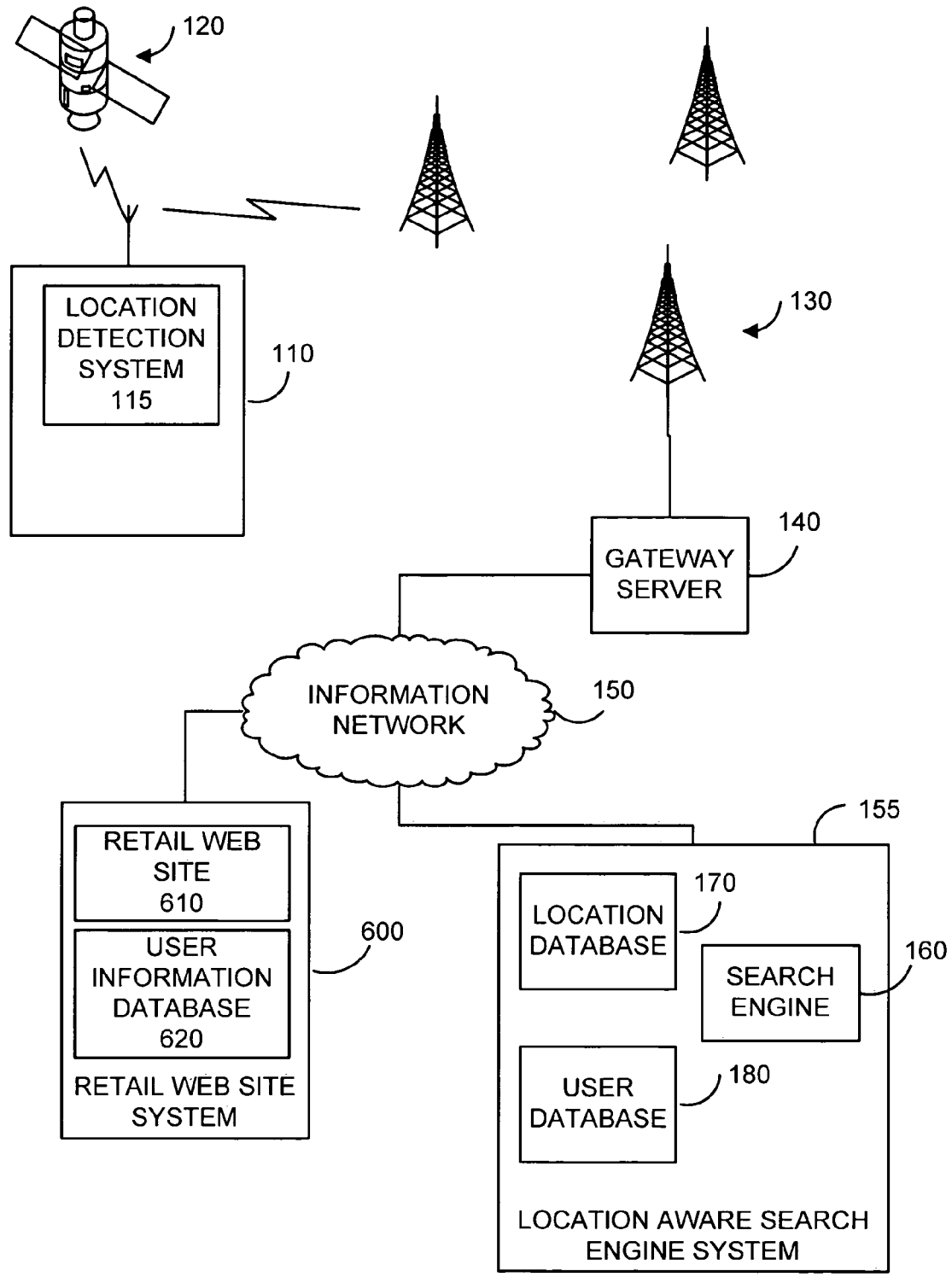
FIG. 6 is a location aware searching system similar to the system of FIG. 1 further including a retail web site system, according to an exemplary embodiment.

Referring now to FIG. 6, a location aware searching system 600, similar to the system of FIG. 1, but further including a web site system 600 is shown, according to an exemplary embodiment. Web site system 600 may be any type of computing system configured to host a web site 610 and maintain a database of user information 620. Web site system 600 may be configured to display any type of information and/or provide any type of function, such as retail shopping, a search engine, mapping functions, etc.

According to an exemplary embodiment, web site system 600 may be a web site associated with a retail goods provider. Web site 610 may be configured as a web page or series of web pages configured to offer goods for sale to users of the web site 610. For example, where the retailer is a seller of printed materials, web site 610 may be configured to allow a user to search, browse, and purchase the printed materials through web site 610. Web site 610 may further be configured to perform additional functions such as storing wish lists, generating one or more suggestions to the user, etc.

Retail web site system 600 may include programming logic configured to maintain the database of user information 620. Database of user information 620 may be populated based on information associated with the user such as the user's name, the user's address, the user's gender, the user's income level, etc. Database 620 may further be populated based on the user's activity at web site 610. For example, database 620 may be populated based on the user's past purchasing activity, the user's searches performed at web site 610, the items in the user wish list, etc.

Database 620 may be used by system 600 and/or system 100 to identify a user group, described above with reference to step 430, or define user attributes, described above with reference to step 420, that can be associated with the user, as described above with reference to FIG. 4. For example, the user may have recently purchased a Japanese cook book through a retail web site. The purchase history information may be used to filter the listing of common searches such that searches and corresponding search results related to Japanese cooking, such as, for example, Japanese restaurants, will be displayed more prominently. Accordingly, other things being equal, if the user has just purchased a Japanese cookbook, the user may be presented with common searches relating to Japanese restaurants and not other types of restaurants, even if the searches for the other types of restaurants were equally commonly performed at that location.

Figure 7:
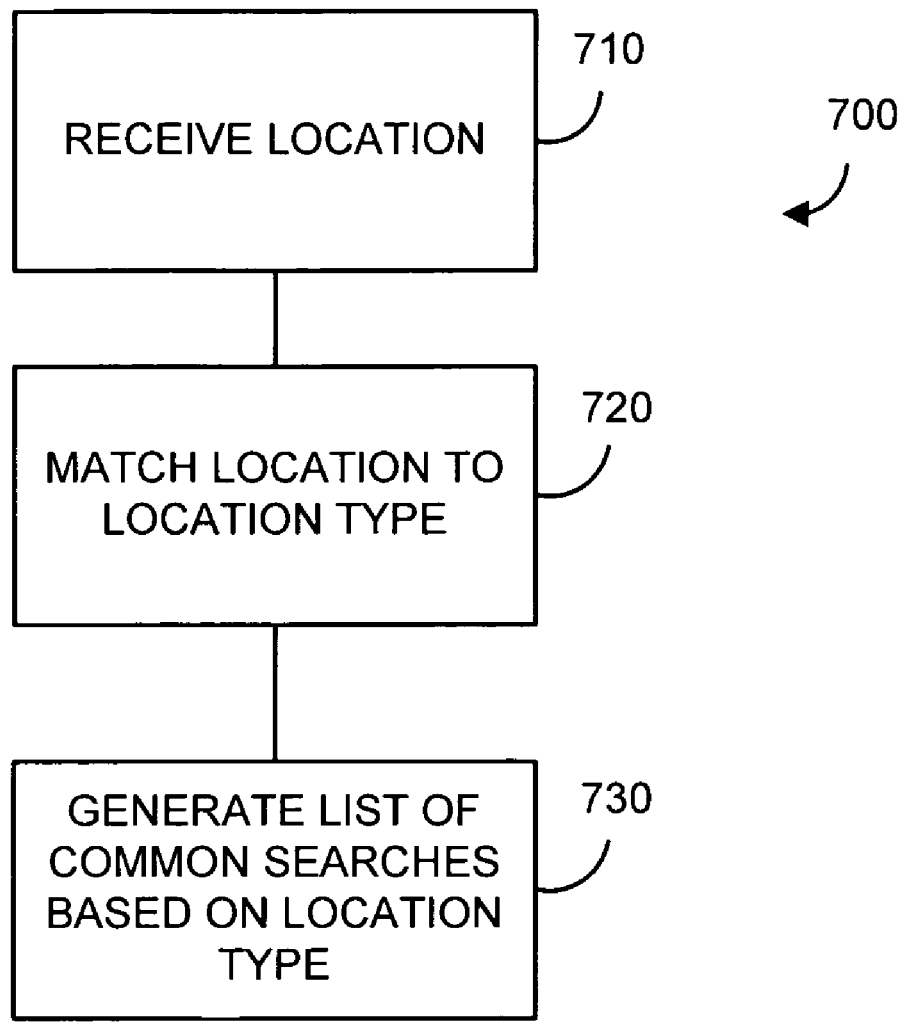
FIG. 7 is a flowchart representative of a method of providing a listing of common searches based on location where the location is a location type, according to an exemplary embodiment.

Referring now to FIG. 7, a flowchart 700 representative of a method of providing a listing of common searches based on location where the location is a location type is shown, according to an exemplary embodiment. Flowchart 700 illustrates a method where a received location is matched to a location type such that the listing of common searches can be aggregated with searches performed by the user at other locations of the same type.

In a step 710, the current location of device 110 is determined, similar to step 320 in method 300, described above with reference to FIG. 3. The location may be received as an input value or may be determined by search engine system 155.

In a step 120, the determined location may be matched to a location type. Location types may include a variety of types. The types may be defined either specifically or broadly. For example, a location type may include cold weather cities. This location type may be associated with any city location having a latitude that is above a certain degree and/or based on historical average temperatures for the city location. According to another example, the location type may be coffee shop. This location type may determined by matching received GPS coordinates with a street address and determining that a coffee shop is located at that street address. Although two examples are provided, it should be understood that the concept of a location type may be broadly applied to any selection criteria that may be associated with a location. The location type may also be determined based on any of a variety of methods.

In a step 730, a listing of common searches may be generated based on the location type independent of the specific location, similar to step 330 of FIG. 3. The listing may also be customized based on one or more filters as described above with reference to FIG. 4.

For example, a user of device 110 may enter a gourmet coffee shop. The gourmet coffee shop may be located close to a brokerage house such that the most common searches at that coffee house are related to stock market news. However, the particular user may have a filter set up such that the listing of common searches is displayed according to location type. Accordingly, the listing of common searches may uses an expanded group of users that reflects a broader range of interests.

Alternatively, it may be that this particular user, although liking gourmet coffee, does not like the food that is served at gourmet coffee shops and always performs a search for other nearby food vendors when he visits a gourmet coffee shop. Accordingly, one exemplary filter designating a user group may be automatically configured to include just the user to target that user's particular interests. The listing of common searches for this solo user group, including just the user, may indicate that the most common search associated with the location type of coffee shop is "doughnuts." Accordingly, the user may select to run this highly personalized search using the listing of common searches.

Although the filtering of search results is described above as being done during generation of the listing of common searches, one of skill in the art will recognize that the filtering step may be performed by the user at any time. For example, filtering of the listing of common searches may be performed based on a selection by the user of a filter while the user is viewing a unfiltered listing of common searches.

Here and throughout, terms such as "user," are to be understood in the broadest possible sense. By way of illustration and not of limitation, a "user" may be an individual who visits and views or otherwise perceives a listing of common searches and any associated information or advertisements via a web browser or other client software program running on a personal computer, wireless handheld device, or the like, but may also be, for example, a corporate or other entity whose servers access published web content and advertisements by invoking web services through appropriate application programming interfaces (APIs); a "user" may or may not be the intended or actual end consumer of a product or service that is the subject of an advertisement, etc. In sum, persons of skill in the art will appreciate that a wide variety of actors, more than can be conveniently set forth here, can play the roles of "user" for purposes of the present invention. In a similar vein, and as will be apparent from the foregoing, terms such as "web page," "website," and so forth are used to give specific illustrative examples of settings in which search content and advertisements can be presented to and perceived by users. Such examples are not intended to be limiting, and persons of skill in the art will appreciate that many other such settings now known or yet to be developed may be suitable to the practice of the present invention in specific embodiments.

It should be noted that although flow charts may be provided herein to show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule-based logic and other logic to accomplish the various database searching steps, correlation steps, comparison steps and decision steps. It should also be noted that the word "engine" as used herein and in the claims is intended to encompass implementations using one or more lines of software code, and/or hardware implementations, and/or equipment for receiving manual inputs. It is to be understood that any method steps as recited herein (e.g., in the claims) may be performed by a configuration utility (e.g., Java™-based) executed by a computing device based on input by a user. Of course, according to various alternative embodiments, any suitable configuration utility, application, system, computing device, etc. may be used to execute, implement and/or perform method steps as recited in this disclosure (including the claims).

The invention is described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, PROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A computer-implemented method for providing a listing of search requests based on a location, comprising:
    automatically, without user input:
        receiving a current location and an indication of movement of a mobile computing device;
        predicting a future location of the mobile computing device based on the current location and the indication of movement of the mobile computing device;
        in response to predicting the future location, generating a set of search requests determined to be relevant to the predicted future location; and
        transmitting the set of search requests to the mobile computing device,
        wherein each of the set of search requests is capable of being executed from the mobile computing device.

2. The computer-implemented method of claim 1, wherein the set of search requests is filtered such that only search requests performed by a defined user group are used in generating the listing.

3. The computer-implemented method of claim 1, wherein the set of search requests is filtered based on one or more user attributes.

4. The computer-implemented method of claim 1, wherein the set of search requests is filtered based on a geographic proximity of the search requests to the location.

5. The computer-implemented method of claim 1, wherein the set of search requests is filtered based on information received from a news source.

6. The computer-implemented method of claim 1, wherein receiving a current location includes receiving coordinates from a global positioning satellite.

7. The computer-implemented method of claim 1, wherein receiving a current location includes receiving a current location generated based on cell tower triangulation.

8. The computer-implemented method of claim 1, wherein generating the set of search requests includes generating the set based on a location type associated with the predicted future location.

9. The method of claim 1, wherein the indication of movement of the mobile computing device includes at least one of an orientation of movement or a direction of movement.

10. A location aware searching system, comprising:
    a location database configured to maintain a plurality of locations and a plurality of search requests; and
    a location aware search engine system, the location aware search engine system including a computer program stored on a computer-readable medium, configured to automatically, without user input, perform the steps of:
        receiving a current location and an indication of movement of a mobile computing device;
        predicting a future location for the mobile computing device based on the current location and indication of the movement of the mobile computing device;

in response to predicting the future location, generating a set of search requests, from the plurality of search requests, determined to be relevant to the predicted future location; and transmitting the set of search requests to the mobile computing device, wherein each of the set of search requests is capable of being executed from the mobile computing device.

11. The system of claim 10, wherein the set of search requests further includes search information associated with each of the search requests.

12. The system of claim 11, wherein generating the set of search requests further includes sorting the set based on the search information associated with the search requests.

13. The system of claim 10, further including an auto-complete search term engine configured to suggest one or more search terms based on the first letters of a search term being entered by a user and based on the set of search requests.

14. The system of claim 10, wherein the system further includes a user database configured to store one or more attributes associated with a user of a mobile device and wherein the set of search requests is filtered based on one or more of the user attributes.

15. The system of claim 10, wherein the set of search requests is filtered based on a geographic proximity of the search requests to the location.

16. The system of claim 10, wherein receiving a location includes receiving a location generated based on a cell tower triangulation method.

17. The system of claim 10, wherein generating the set of search requests includes generating the set based on a location type associated with the predicted future location.

18. The method of claim 10, wherein the indication of movement of the mobile computing device includes at least one of an orientation of movement or a direction of movement.

19. A location aware searching system, comprising:

a web site system, the web site system including computer program logic configured to provide an online web site and configured to generate a user profile for a user based on activity of the user when visiting the web site; and a location aware search engine system, the location aware search engine system including computer program logic configured to automatically, without user input, perform the steps of:

receiving a current location and an indication of movement of a mobile computing device;

predicting a future location for the mobile computing device based on the current location and the indication of movement of the mobile computing device;

in response to predicting the future location, generating a set of search requests, from the plurality of search requests, determined to be relevant to the predicted future location;

filtering the set of search requests based on the user profile from the web site system; and transmitting the filtered set of search requests to the mobile computing device, wherein each of the filtered set of search requests is capable of being executed from the mobile computing device.

20. The system of claim 19, wherein the location aware search engine is configured to assign the user to a user group based on the user profile from an online retail service engine, and further wherein the set of search requests is generated based at least in part on the user group.

21. The system of claim 20, wherein the user profile includes a past purchasing history for the user.

22. The system of claim 19, wherein the location aware search engine system is further configured to filter the set of search requests based on a geographic proximity of the search requests to the location.

23. The system of claim 19, wherein the location aware search engine system is further configured to filter the set of search requests based on information received from a news source.

24. The system of claim 19, wherein receiving a location includes receiving coordinates from a global positioning satellite.

25. The system of claim 19, wherein receiving a location includes receiving a location generated based on a cell tower triangulation method.

26. The system of claim 19, wherein generating the set of search requests includes generating the set based on a location type associated with the location.

27. The system of claim 19, wherein the web site system is configured as a retail web site configured to allow the user to make online purchases of goods or services.

28. The system of claim 19, wherein the web site system includes an auto-complete search term engine configured to suggest one or more search terms based on the first letters of a search term being entered by a user and based on the set of search requests.

29. The system of claim 19, wherein the indication of movement of the mobile computing device includes at least one of an orientation of movement or a direction of movement.

* * * * *

UNITED STATES PATENT AND TRADEMARK OFFICE
CERTIFICATE OF CORRECTION

PATENT NO. : 7,565,157 B1 Page 1 of 1
APPLICATION NO. : 11/283056
DATED : July 21, 2009
INVENTOR(S) : Ruben E. Ortega et al.

It is certified that error appears in the above-identified patent and that said Letters Patent is hereby corrected as shown below:

Specification

Column 4, Line 1, please delete "such a" and insert -- such as --

Column 5, Line 15, please delete "interest sightseeing" and insert -- interested in sightseeing --

Column 5, Line 49, please delete "searches listing" and insert -- search listings --

Column 7, Line 55, please delete "searched" and insert -- searches --

Column 8, Line 28, before the word "one" please insert -- on --

Column 8, Line 60, please delete "of" and insert -- on --

Column 11, Line 41, please delete "uses" and insert -- use --

In the Claims

Claim 2, Column 14, Line 33, please delete "listing" and insert -- set --

Signed and Sealed this

Twenty-fourth Day of November, 2009

David J. Kappos
*Director of the United States Patent and Trademark Office*